(12) United States Patent
Edelstein (10) Patent No.: US 7,707,004 B2
(45) Date of Patent: Apr. 27, 2010

(54) LOCATING FERROMAGNETIC OBJECTS IN A SINGLE PASS

(75) Inventor: Alan S. Edelstein, Alexandria, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 253 days.

(21) Appl. No.: 11/852,484

(22) Filed: Sep. 10, 2007

(65) Prior Publication Data
US 2009/0070063 A1    Mar. 12, 2009

(51) Int. Cl.
*G01C 9/00*    (2006.01)
(52) U.S. Cl. ....................................... 702/152
(58) Field of Classification Search ......... 702/150–153, 702/156; 324/207.11–207.19
See application file for complete search history.

(56) References Cited
U.S. PATENT DOCUMENTS
6,539,327 B1*   3/2003   Dassot et al. ............... 702/150

6,675,123 B1    1/2004   Edelstein

* cited by examiner

*Primary Examiner*—Drew A Dunn
*Assistant Examiner*—Stephen J Cherry
(74) *Attorney, Agent, or Firm*—Guy M. Miller; Alan I. Kalb

(57) ABSTRACT

A ferromagnetic object is located by moving magnetic sensors along a path in an area of detection; using the sensors to measure a total magnetic field in the area of detection; using the sensors to measure all three vector components of magnetic field as the sensors travel along the path and passes the object; computing theoretical vector components of the total magnetic field in the area of detection; matching the measured vector components with the computed theoretical vector components of the total magnetic field; calculating an error measurement between matched measured vector components and computed theoretical vector components of the magnetic field; determining optimized values of parameters that minimize an error between the measured vector components and computed theoretical vector components of the magnetic field; and determining a position of the object based on the measured components of the magnetic field as a function of the optimized values.

17 Claims, 7 Drawing Sheets

LOCATING FERROMAGNETIC OBJECTS IN A SINGLE PASS

CROSS-REFERENCE TO RELATED APPLICATIONS

This application relates to co-pending U.S. patent application entitled "Locating Stationary Magnetic Objects" application Ser. No. 11/852,504, filed concurrently herewith, the contents of which, in its entirety, is herein incorporated by reference.

GOVERNMENT INTEREST

The embodiments described herein may be manufactured, used, and/or licensed by or for the United States Government without the payments of royalties thereon.

BACKGROUND

1. Technical Field

The embodiments herein generally relate to magnetic sensing, and, more particularly, to locating ferromagnetic objects.

2. Description of the Related Art

Locating ferromagnetic objects by rastering over large areas can be very time consuming. A system and method for tracking magnetic objects is described in U.S. Pat. No. 6,675,123 (hereinafter referred to as "the '123 patent") issued to Edelstein, the complete disclosure of which, in its entirety, is herein incorporated by reference. As the '123 patent describes all types of land vehicles, ships, and aircraft have structural and power systems capable of generating substantial magnetic signatures. Even small inert objects may exhibit sufficient magnetization to be observed from a distance. These applications include covert handgun detection to protect buildings and their occupants; pinpointing unexploded ordnance at converted military bases; and locating the position and depth of underground pipes prior to construction activities. The ability to track magnetic objects is also crucially important in other areas, such as medicine. For example, controlling the orientation, forces, and/or motion of internally implanted devices.

A variety of magnetic sensor data processing algorithms, methods, systems and devices thereof capable of localizing, quantifying, and classifying objects based on their magnetic fields and magnetic signatures have been developed. Some conventional techniques detect, locate, and classify magnetic objects based on a large set of measurements distributed over space and/or time. Some conventional techniques involve using measurements of an object's magnetic dipole moment, or are based on electromagnetic anomaly detection technology, which senses an electromagnetic anomaly and pinpoints it as close to real time. Such a technique can measure how close a target is located to a sensor head, while locating the target or magnetic object in three dimensions and thereafter evaluating its orientation.

One of the problems associated with such conventional techniques for tracking magnetic objects is that they are generally based on the utilization of three components of a detected magnetic field. Typically, if measurements of the vector magnetic field are made, great care must be taken to minimize rotational vibrations. However, because the Earth's magnetic field is so large (i.e., on an order 50,000 nT), it is generally difficult to differentiate rotational vibrations from signals from an object.

Programs and methodologies based on such techniques typically require the inversion of a matrix and additionally require a relatively great deal of processing time. Such programs and methodologies also usually require obtaining measurements from several sensors simultaneously. In order to perform several measurements on nearby weak sources and to avoid rotational vibrations, the sensors should be placed close to one another on a rigid frame. If the sensors are configured in this manner, the difference between the signals from strong distant sources is generally small. Additionally, obtaining accurate measurements of these small differences requires expensive sensors and the use of gradiometer algorithms. Unfortunately, such techniques are generally time consuming and may also be inefficient. While the '123 patent provides a valuable technique for overcoming the problems of the conventional tracking techniques, there remains a need for a technique for locating the position of ferromagnetic objects.

SUMMARY

In view of the foregoing, an embodiment herein provides a method of locating a ferromagnetic object in an area of detection represented by a dimensional space comprising x, y, and z axes, and a program storage device readable by computer comprising a program of instructions executable by the computer to perform the method of locating a ferromagnetic object in an area of detection, wherein the method comprises moving an array of magnetic sensors along a straight line path with a velocity v in the area of detection; using the magnetic sensors to measure a total magnetic field in the area of detection; using the magnetic sensors to measure all three vector components of magnetic field as the array of magnetic sensors travels along the path and passes the ferromagnetic object; computing theoretical vector components of the total magnetic field in the area of detection; matching the measured vector components of the total magnetic field with the computed theoretical vector components of the total magnetic field; calculating an error measurement, E, between matched measured vector components and computed theoretical vector components of the magnetic field; determining optimized values of parameters that minimize an error between the measured vector components and computed theoretical vector components of the magnetic field; and determining a position of the ferromagnetic object based on the measured components of the magnetic field as a function of the optimized values of the parameters.

Preferably, the magnetic components of the magnetic field comprise three calculated magnetic vector components are represented by:

$$B_{cx} = [3n_x(t)(\vec{n}(x) \cdot \vec{M}) - M_x]/r(t)^3$$

$$B_{cy} = [3n_y(t)(\vec{n}(x) \cdot \vec{M}) - M_y]/r(t)^3$$

$$B_{cz} = [3n_z(t)(\vec{n}(x) \cdot \vec{M}) - M_z]/r(t)^3$$

as the magnetic sensors are moved in the straight line path past the ferromagnetic object, wherein $M_x = M \sin(\phi)\cos(\theta)$, $M_y = M \sin(\phi)\sin(\theta)$, and $M_z = M \cos(\phi)$, and wherein $\vec{n}(x)$ is a unit vector between a magnetic dipole of the ferromagnetic object and a position of the magnetic sensors.

Moreover, $$n_x = vt/r$$

$$n_y = y/r$$

$$n_z = z/r$$

$$r = \sqrt{(vt)^2 + y^2 + z^2}$$

are components of $\vec{n}(x)$, t is time, and v is velocity along the straight line path. Additionally, the matching process comprises matching an amplitude of a largest measured vector component of the magnetic field to a corresponding computed theoretical vector component of the magnetic field by multiplying the computed theoretical vector components of the magnetic field by a predetermined constant.

Moreover, the method may further comprise shifting a position along an x axis for the magnetic field vector components such that a maximum of the vector component corresponding to a largest measured component occurs at a same x axis coordinate. Also, the error measurement, E, is determined by:

$$E^2 = (1/T)\int_0^T [(B_{cx}(t) - B_{mx}(t))^2 + (B_{cy}(t) - B_{my}(t))^2 + (B_{cz}(t) - B_{mz}(t))^2] dt$$

where $B_{mx}(t)$, $B_{my}(t)$, and $B_{mz}(t)$ are the measured vector components of the magnetic field as a function of t, and T is the time to pass the object.

The method may further comprise determining values of angular parameters to specify a direction of magnetization of the ferromagnetic object to determine computed theoretical vector components that minimize the error measurement, F, wherein the values represent optimized values. Moreover, the method may further comprise using the values of the angular parameters that minimize the error measurement, E, to calculate a position where a maximum total magnetic field occurs. Also, the method may further comprise determining a shift of position along the x axis between a position of the ferromagnetic object and the position where a maximum total magnetic field occurs.

Another embodiment provides a system for locating a ferromagnetic object in an area of detection represented by a dimensional space comprising x, y, and z axes, wherein the system comprises an array of magnetic sensors moving along a straight line path with a velocity v in the area of detection, wherein the magnetic sensors are adapted to (i) measure a total magnetic field in the area of detection, and (ii) measure all three vector components of magnetic field as the array of magnetic sensors travels along the path and passes the ferromagnetic object; processing means for computing theoretical vector components of the total magnetic field in the area of detection; processing means for matching the measured vector components of the total magnetic field with the computed theoretical vector components of the total magnetic field; processing means for calculating an error measurement between matched measured vector components and computed theoretical vector components of the magnetic field; processing means for determining optimized values of parameters that minimize an error between the measured vector components and computed theoretical vector components of the magnetic field; and processing means for determining a position of the ferromagnetic object based on the measured components of the magnetic field as a function of the optimized values of the parameters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a technique for locating the position of ferromagnetic objects. The embodiments herein achieve this by providing a technique for locating the position of a ferromagnetic object in a single pass of the area of detection. Referring now to the drawings, and more particularly to FIGS. 1 through 6, where similar reference characters denote corresponding features consistently throughout the figures, there are shown preferred embodiments.

Figure 1:
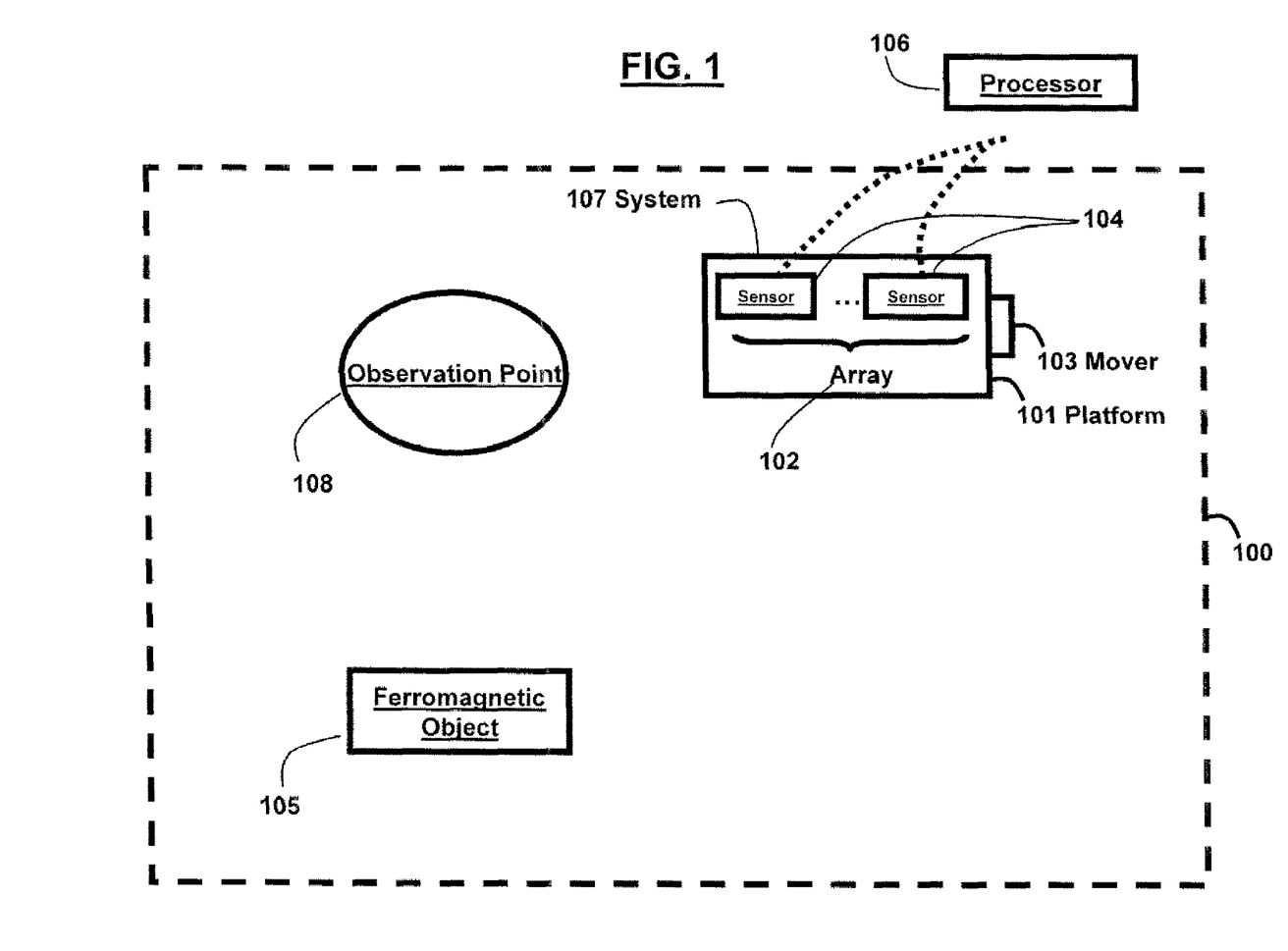
FIG. 1 illustrates a schematic diagram of a system according to an embodiment herein.

FIG. 1 illustrates a diagram of a system 107 for locating a ferromagnetic object 105 in an area of detection 100 represented by a dimensional space comprising x, y, and z axes (axes not shown in FIG. 1) according to an embodiment herein, wherein the system 107 comprises means 103 for moving an array 102 of magnetic sensors 104 along a straight line path with a velocity v in the area of detection 100. The array 102 of magnetic sensors 104 may be on a platform 101, for example, and the means 103 for moving the array 102 of magnetic sensors 104 may comprise a vehicle or other automotive transporter. The magnetic sensors 104 are adapted to measure a total magnetic field in the area of detection 100; and measure all three vector components of magnetic field as the array of magnetic sensors 104 is moved along the path and passes the ferromagnetic object 105. The system 107 further comprises a processor 106 in communication with the magnetic sensors 104 and adapted to compute theoretical vector components of the total magnetic field in the area of detection 100; match the measured vector components of the total magnetic field with the computed theoretical vector components of the total magnetic field; calculate an error measurement, E, between matched measured vector components and computed theoretical vector components of the magnetic field; determine optimized values of parameters that minimize an error between the measured vector components and computed theoretical vector components of the magnetic field; and determine a position of the ferromagnetic object 105 based on the measured components of the magnetic field as a function of the optimized values of the parameters.

The magnetic components of the magnetic field comprise three calculated magnetic vector components that may be represented by:

$$B_{cx}=[3n_x(t)(\vec{n}(x)\cdot\vec{M})-M_x]/r(t)^3$$

$$B_{cy}=[3n_y(t)(\vec{n}(x)\cdot\vec{M})-M_y]/r(t)^3$$

$$B_{cz}=[3n_z(t)(\vec{n}(x)\cdot\vec{M})-M_z]/r(t)^3$$

as the magnetic sensors 104 are moved in the straight line path past the ferromagnetic object 105, wherein $M_x=M\sin(\phi)\cos(\theta)$, $M_y=M\sin(\phi)\sin(\theta)$, and $M_z=M\cos(\phi)$, and wherein $\vec{n}(x)$ is a unit vector between a magnetic dipole of the ferromagnetic object 105 and an observation point 108, wherein:

$$n_x=vt/r$$

$$n_y=y/r$$

$$n_z=z/r$$

$$r=\sqrt{(vt)^2+y^2+z^2}$$

are components of $\vec{n}(x)$, t is the time, and v is the velocity.

The error measurement, E, is determined by:

$$E^2 = (1/T)\int_0^T [(B_{cx}(t)-B_{mx}(t))^2 + (B_{cy}(t)-B_{my}(t))^2 + (B_{cz}(t)-B_{mz}(t))^2]\,dt$$

where $B_{mx}(t)$, $B_{my}(t)$, and $B_{mz}(t)$ are the measured vector components of the magnetic field as a function of t, and T is the time to pass the object 105.

The processor 106 may be further adapted to match an amplitude of a largest measured vector component of the magnetic field to the corresponding computed theoretical vector component of the magnetic field by multiplying the computed theoretical vector components of the magnetic field by a predetermined constant. Additionally, the processor 106 may be further adapted to determine values of angular parameters to specify a direction of magnetization of the ferromagnetic object 105 to determine computed theoretical vector components that minimize the error measurement, E, wherein the values represent optimized values. Moreover, the processor 106 may be further adapted to use the values of the angular parameters that minimize the error measurement, E, to calculate a position where a maximum total magnetic field occurs.

Generally, the embodiments herein provide a technique for locating the position of a ferromagnetic object 105 at a distance away from the object 105 that is large enough that the magnetic field from the object 105 reduces to that of a dipole. This distance may be three or four times the size of the object 105. The object 105 may be buried under ground, at ground level, or in the air. The '123 patent presents a technique for finding a line through the object 105. The largest error made by the method is approximately 3%. This possible error was a result of assuming that the maximum total field occurs when the object 105 was at the point of closest approach. This error occurs in finding the line through the object 105. The method in the '123 patent assumes relative motion such that the object 105 passes by the array 102 of magnetic sensors 104 in a straight line. The method in the '123 patent also assumes the largest maximum total field occurs at the position of closest approach of a sensor 104 to the object 105. The embodiments herein provide a technique where this could be removed.

Figure 2:
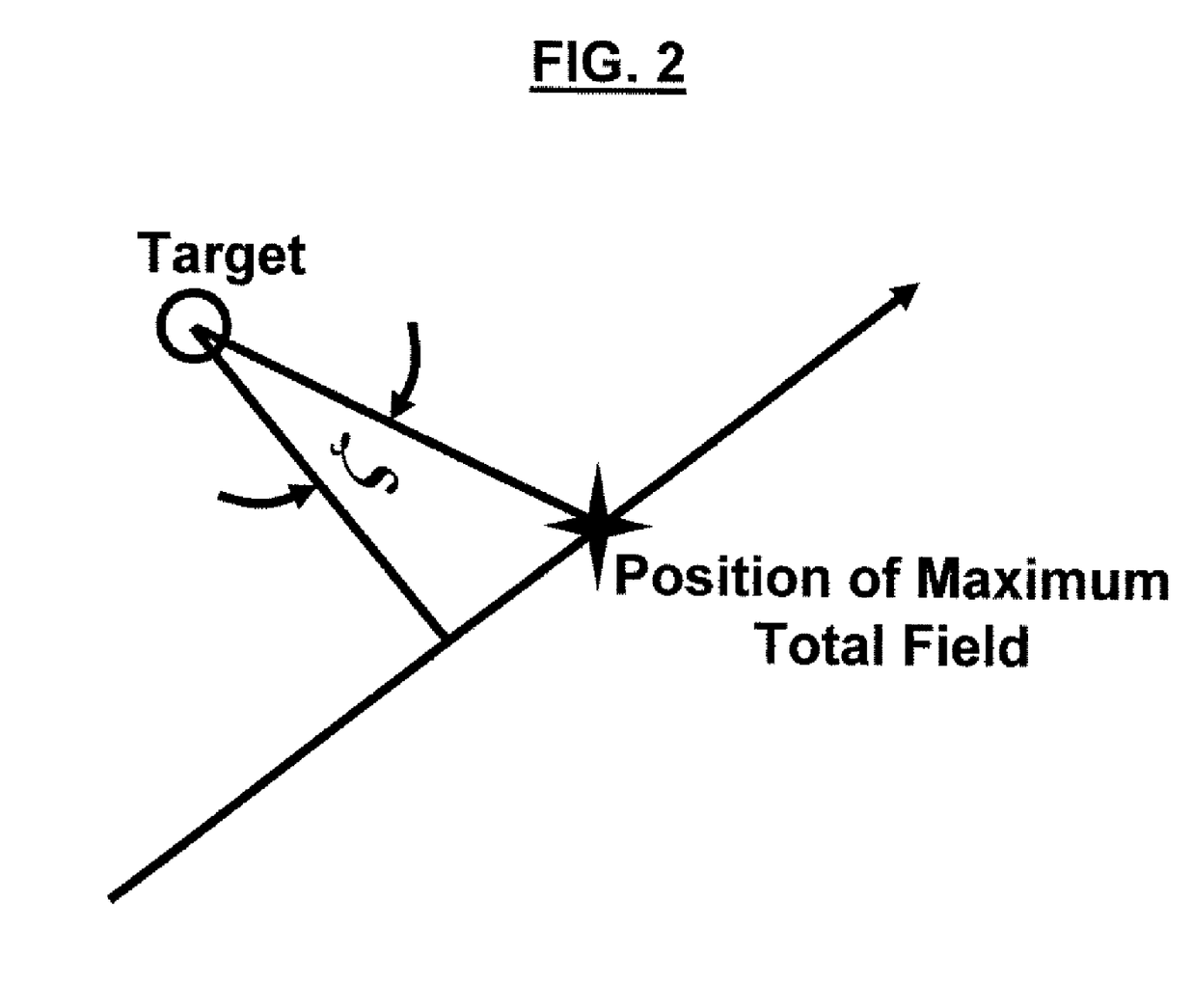
FIG. 2 is a schematic representation illustrating the position of the maximum total magnetic field of a ferromagnetic object according to an embodiment herein.
Figure 3:
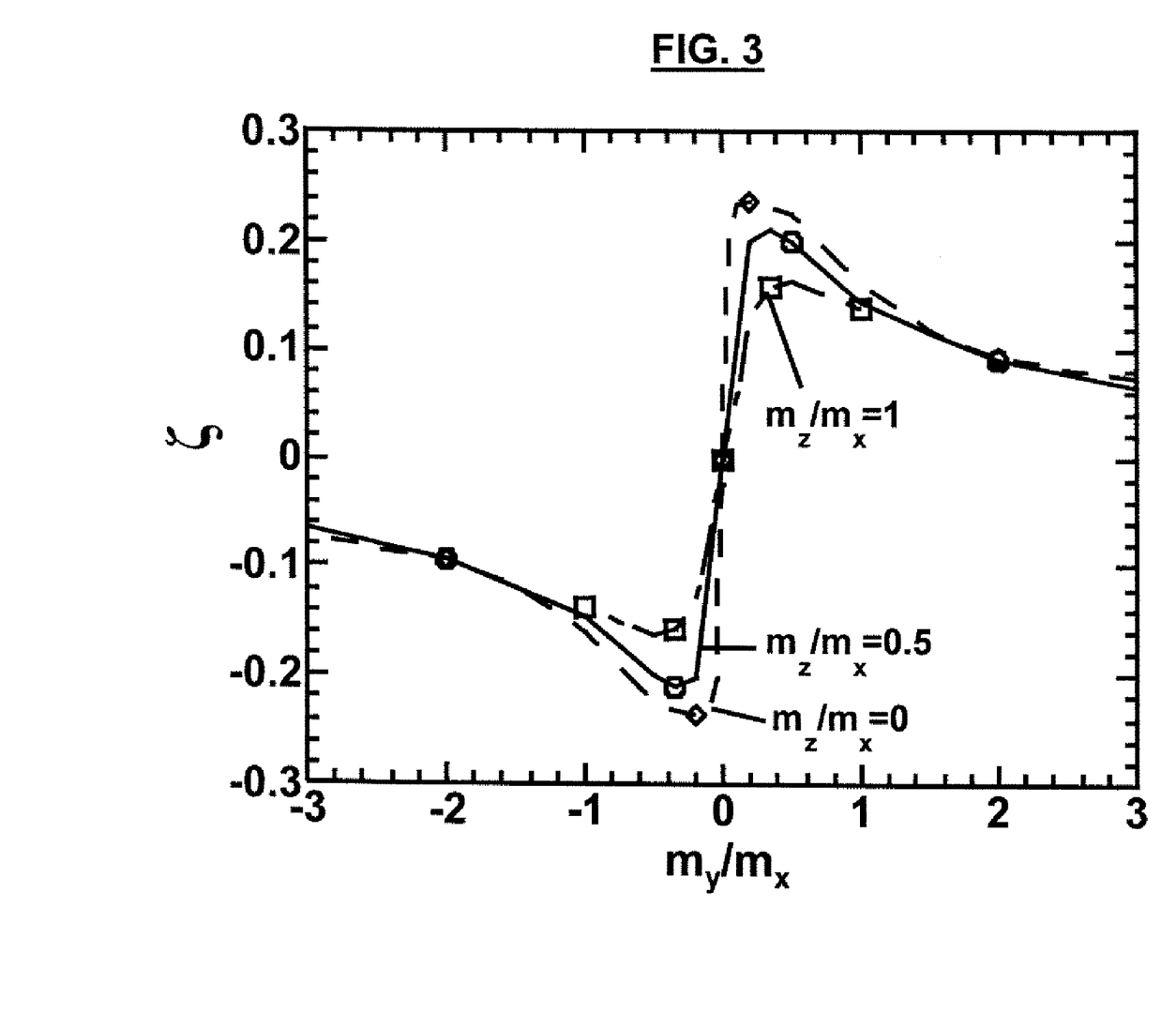
FIG. 3 illustrates a graphical representation of the position of the maximum total magnetic field as a function of the direction of the moment according to an embodiment herein.

FIG. 2 illustrates a situation where the maximum total magnetic field does not occur at the position of closest approach. In FIG. 3 the tangent of the angle ζ shown in FIG. 2 is provided for different values of $M_x$, $M_y$, and $M_z$ (magnetic moment components). FIG. 3 illustrates how the position of the maximum field deviates from the point of closest approach for different values of $M_x$, $M_y$, and $M_z$. Co-pending U.S. patent application entitled "Locating Stationary Magnetic Objects" application Ser. No. 11/852,504 describes a technique for finding the angle ζ and finding the position of the ferromagnetic object 105. Using that technique, a single pass by the ferromagnetic object 105 will determine the approximate position of the object 105. Moreover, using that technique and two passes by the ferromagnetic object 105 will determine the exact position of the object 105. Preferably, in the above-mentioned co-pending U.S. patent application, the object 105 is stationary.

Figure 4A:
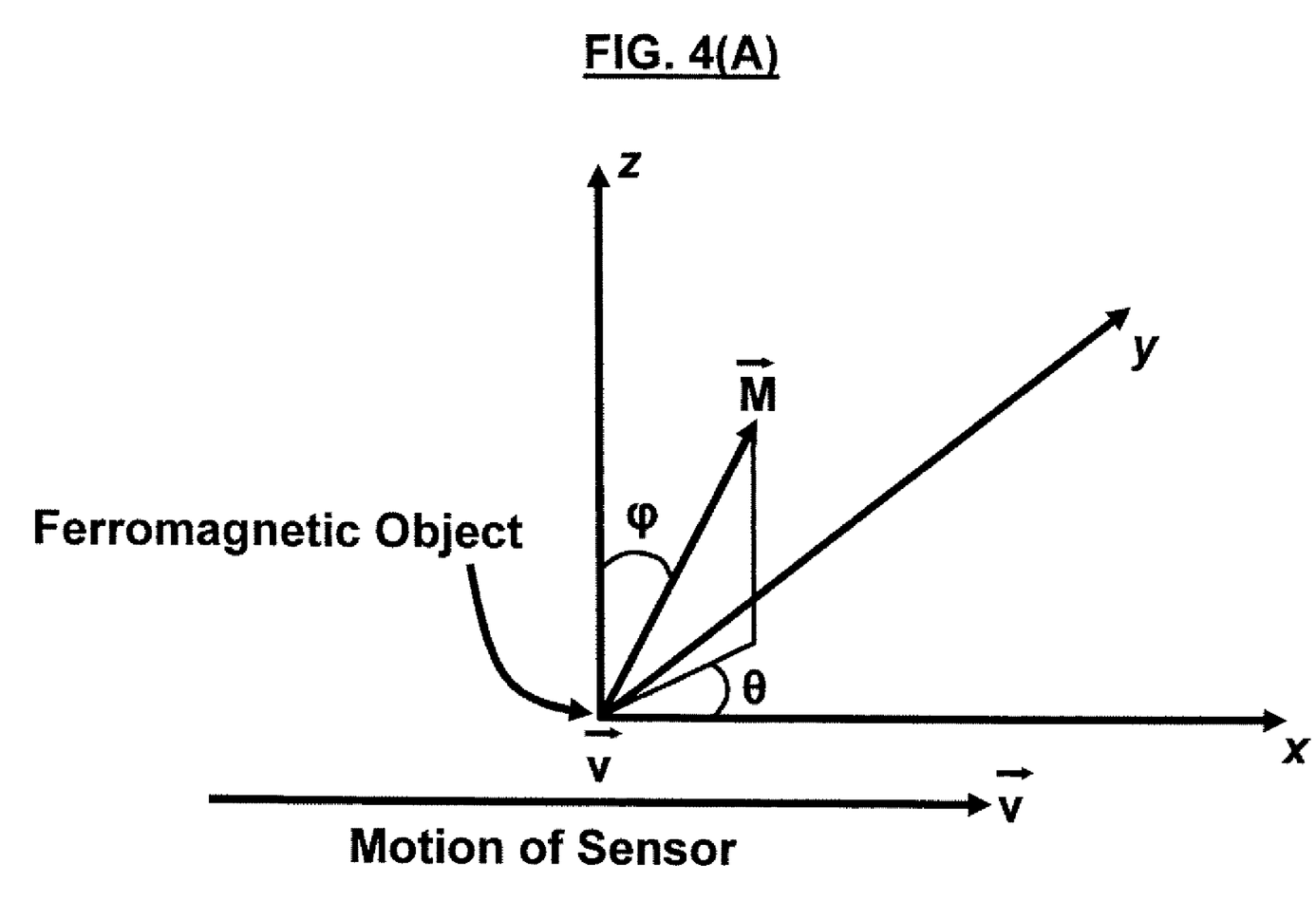
FIG. 4(A) illustrates a graphical representation of the motion of a magnetic sensor moving in a straight line past a ferromagnetic object with a magnetic moment $\vec{M}$ according to an embodiment herein.

However, the techniques provided by the embodiments herein can determine the exact position of the object 105 in a single pass if the object 105 is moving and the sensors 104 are stationary or even if both the object and the sensors are moving. The technique provided by the embodiments herein utilizes the results of measurements from an array 102 of magnetic sensors 104 (for example, magnetometers) which includes a vector magnetic sensor, wherein each sensor 104 in the array 102 determines the total magnetic field of the area of interest. The steps in the procedure are as follows:

(1) First, a set of magnetic sensors 104 that includes a vector magnetic sensor moves in the x direction as shown in FIG. 4(A). Using the measurements of the total magnetic field and the algorithm described in the '123 patent, the line on which the magnetic object 105 resides is determined. Thus, they and z distance to the object has been determined.

(2) The remaining task is to determine the x position. This is accomplished by using the three measured components of the magnetic field as one goes by the ferromagnetic object 105. As the sensor 104 moves past the object 105 it records the three measured components of the magnetic field as a function of x. One can also compute the magnetic field components, which are given by:

$$B_{cx}=[3n_x(t)(\vec{n}(x)\cdot\vec{M})-M_x]/r(t)^3$$

$$B_{cy}=[3n_y(t)(\vec{n}(x)\cdot\vec{M})-M_y]/r(t)^3$$

$$B_{cz}=[3n_z(t)(\vec{n}(x)\cdot\vec{M})-M_z]/r(t)^3 \quad (1)$$

where in spherical coordinates:

$$M_x=M\sin(\phi)\cos(\theta)$$

$$M_y=M\sin(\phi)\sin(\theta)$$

$$M_z=M\cos(\phi)$$

and $\vec{n}(x)$ is a unit vector between the dipole and the observation point 108, which is a moving point along the path of the moving sensor 104, and r is the separation between the dipole and the vector sensor. The direction of the unit vector changes because of the motion along on the x-axis. The components of $\vec{n}$ (x) are:

$$n_x = vt/r$$

$$n_y = y/r$$

$$n_z = z/r$$

$$r = \sqrt{(vt)^2 + y^2 + z^2}$$

where x=vt where v is the velocity of the sensors past the object of interest and t is the time. The quantities y and z are the differences in the y and z coordinates between the position of the object 105 and the path of the sensor 104. The quantities y and z can be determined by the algorithm provided in the '123 patent. Initially, in the calculation, it is assumed that the ferromagnetic object 105 has its x coordinate equal to zero.

(3) The shape of the three computed component signals $B_{cx}(x)$, $B_{cy}(x)$, and $B_{cz}(x)$ are completely determined by v, $\phi$, and $\theta$. Predetermined trial values of v, $\phi$, and $\theta$ are chosen. Here, the velocity v is known in the case of determining the position of a stationary ferromagnetic object 105 if one knows the velocity of the means for moving the sensors 104 past the object 105.

(4) Compute the components of field $B_{cx}(x)$, $B_{cy}(x)$, and $B_{cz}(x)$.

(5) Match the amplitude of the largest measured component field to the corresponding computed component field by multiplying the computed field by a predetermined constant. In this regard, the predetermined constant is a numeric number. For example, if the maximum of the largest measured field component was 10, and the computed component was 2.5, then the predetermined constant equals 4.

(6) Multiply the other two computed component fields by the same predetermined constant.

(7) Shift the computed components along the x-axis so the computed maximum field occurs at the same value of x as the measured maximum field. One may use either t or x for the computations since, they are related by x=vt.

(8) Compute the error E given by:

$$E^2 = (1/T) \int_0^T [(B_{cx}(t) - B_{mx}(t))^2 + (B_{cy}(t) - B_{my}(t))^2 + (B_{cz}(t) - B_{mz}(t))^2] dt \quad (2)$$

where $B_{mx}(t)$, $B_{my}(t)$, and $B_{mz}(t)$ are the measured components of the magnetic field. Moreover, t is the time, T is the time for the sensors 104 to move past the object 105 at a constant velocity.

(9) Repeat the process and find the trial values of $\phi$ and $\theta$ that minimize E. These are the optimized values of $\phi$ and $\theta$.

(10) Compute the components as a function of t with the optimized values of $\phi$ and $\theta$ to find the time $t_m$ when the maximum total field occurs. The total field B is given by:

$$B = \sqrt{B_{cx}^2 + B_{cy}^2 + B_{cz}^2} \quad (3)$$

Figure 4B:
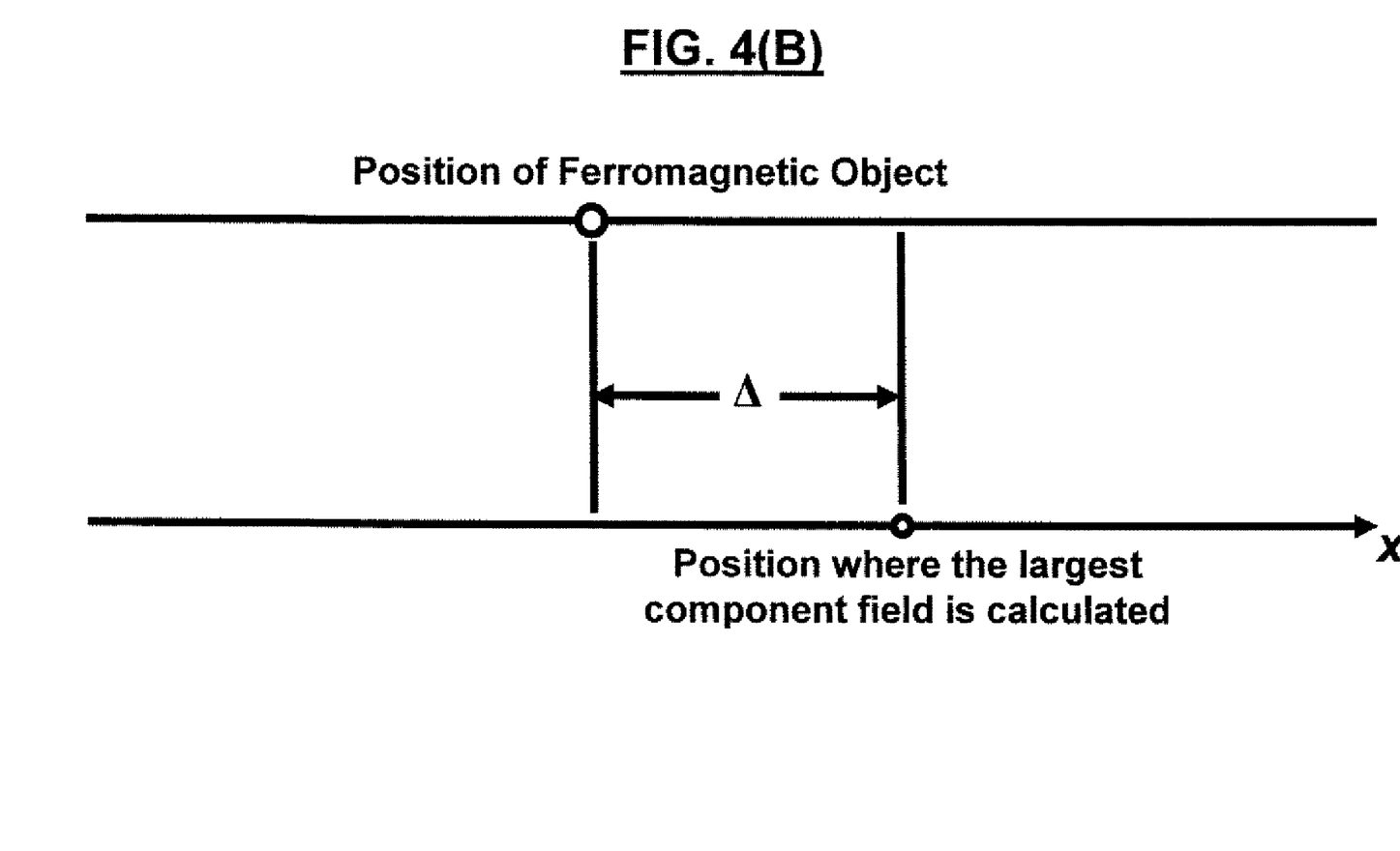
FIG. 4(B) illustrates a graphical representation of a shift in the position of the maximum Δ along the x-axis according to an embodiment herein.

The shift $\Delta$ in x between the position of the ferromagnetic object 105 and the position where the maximum computed component field occurs shown in FIG. 4(B) is $vt_m$. The shift in the x coordinate between the position where the maximum total field was observed and the position of the object 105 is also $\Delta$.

Once the $\phi$ and $\theta$ are determined, one can calculate the components $M_x$, $M_y$, and $M_z$. Thus, the direction of M (of FIG. 4(A)) is known. This gives the magnetic moment of the object 105, which helps in identifying the object 105 (i.e., a large shell casing versus a small handgun, for example).

Figure 5:
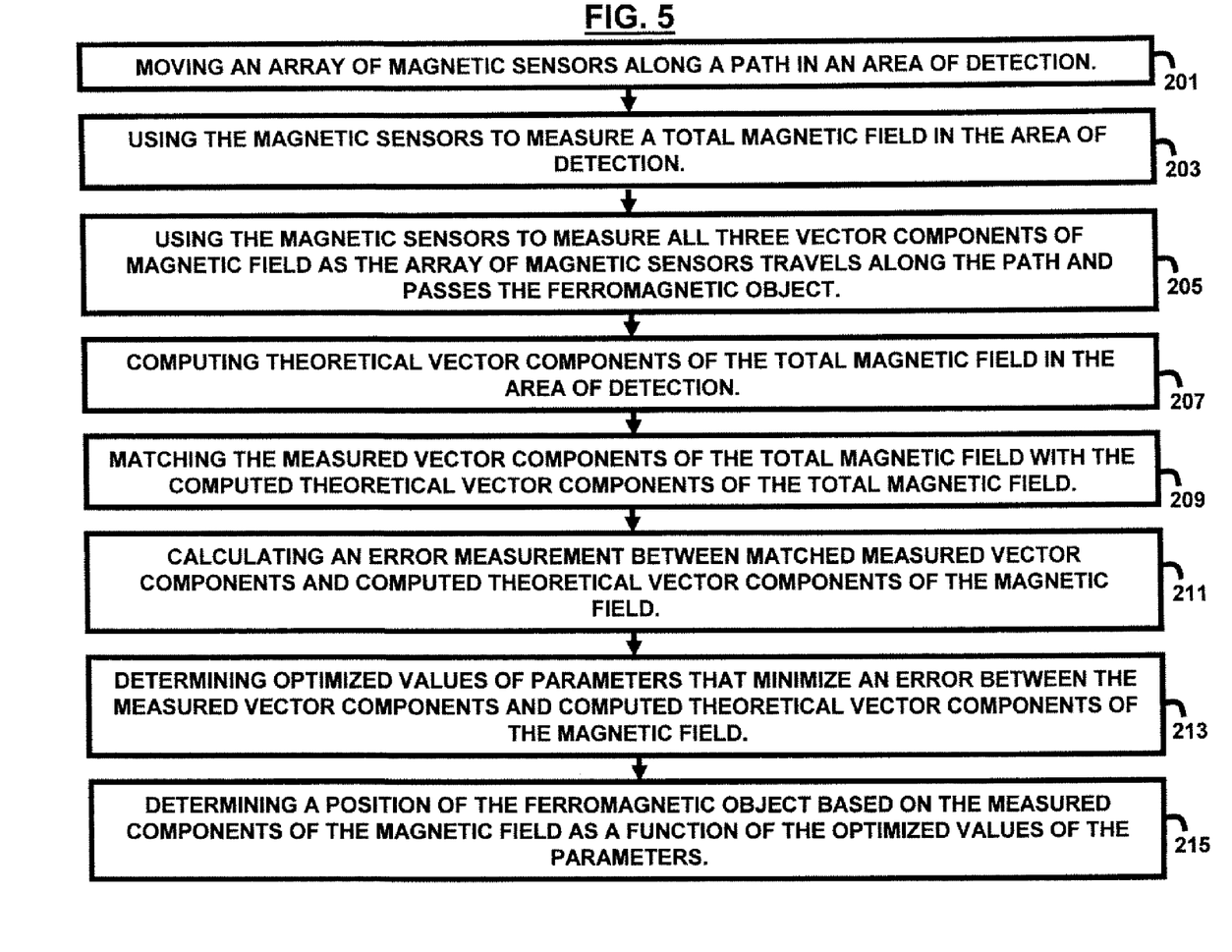
FIG. 5 is a flow diagram illustrating a preferred method according to an embodiment herein.

FIG. 5, with reference to FIGS. 1 through 4(B), is a flow diagram illustrating a method of locating a ferromagnetic object 105 in an area of detection 100 represented by a dimensional space comprising x, y, and z axes, according to an embodiment herein, wherein the method comprises moving (201) an array 102 of magnetic sensors 104 along a straight line path with a velocity v in the area of detection 100; using (203) the magnetic sensors 104 to measure a total magnetic field in the area of detection; using (205) the magnetic sensors 104 to measure all three vector components of magnetic field as the array 102 of magnetic sensors 104 travels along the path and passes the ferromagnetic object 105; computing (207) theoretical vector components of the total magnetic field in the area of detection 100; matching (209) the measured vector components of the total magnetic field with the computed theoretical vector components of the total magnetic field; calculating (211) an error measurement, E, between matched measured vector components and computed theoretical vector components of the magnetic field; determining (213) optimized values of parameters that minimize an error between the measured vector components and computed theoretical vector components of the magnetic field; and determining (215) a position of the ferromagnetic object 105 based on the measured components of the magnetic field as a function of the optimized values of the parameters.

Preferably, the magnetic components of the magnetic field comprise three calculated magnetic vector components are represented by:

$$B_{cx} = [3 n_x(t) (\vec{n}(x) \cdot \vec{M}) - M_x]/r(t)^3$$

$$B_{cy} = [3 n_y(t) (\vec{n}(x) \cdot \vec{M}) - M_y]/r(t)^3$$

$$B_{cz} = [3 n_z(t) (\vec{n}(x) \cdot \vec{M}) - M_z]/r(t)^3$$

as the magnetic sensors 104 are moved in the straight line path past the ferromagnetic object 105, wherein $M_x = M \sin(\phi)\cos(\theta)$, $M_y = M \sin(\phi)\sin(\theta)$, and $M_z = M \cos(\phi)$, and wherein $\vec{n}(x)$ is a unit vector between a magnetic dipole of the ferromagnetic object 105 and a position of the magnetic sensors 104.

Moreover, $$n_x = vt/r$$

$$n_y = y/r$$

$$n_z = z/r$$

$$r = \sqrt{(vt)^2 + y^2 + z^2}$$

are components of $\vec{n}(x)$, t is time, and v is velocity along the straight line path. Additionally, the matching process (209) comprises matching an amplitude of a largest measured vector component of the magnetic field to a corresponding computed theoretical vector component of the magnetic field by multiplying the computed theoretical vector components of the magnetic field by a predetermined constant.

Moreover, the method may further comprise shifting a position along an x axis for the magnetic field vector components such that a maximum of the vector component corresponding to a largest measured component occurs at a same x axis coordinate. Also, the error measurement, E, is determined by:

$$E^2 = (1/T)\int_0^T [(B_{cx}(t) - B_{mx}(t))^2 + (B_{cy}(t) - B_{my}(t))^2 + (B_{cz}(t) - B_{mz}(t))^2] dt$$

where $B_{mx}(t)$, $B_{my}(t)$, and $B_{mz}(t)$ are the measured vector components of the magnetic field as a function of t, and T is the time to pass the object 105.

The method may further comprise determining values of angular parameters to specify a direction of magnetization of the ferromagnetic object 105 to determine computed theoretical vector components that minimize the error measurement, E, wherein the values represent optimized values. Moreover, the method may further comprise using the values of the angular parameters that minimize the error measurement, E, to calculate a position where a maximum total magnetic field occurs. Also, the method may further comprise determining a shift of position along the x axis between a position of the ferromagnetic object 105 and the position where a maximum total magnetic field occurs.

The embodiments herein can take the form of an entirely hardware embodiment, an entirely software embodiment or an embodiment including both hardware and software elements. Preferably, the embodiments that are implemented in software include, but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
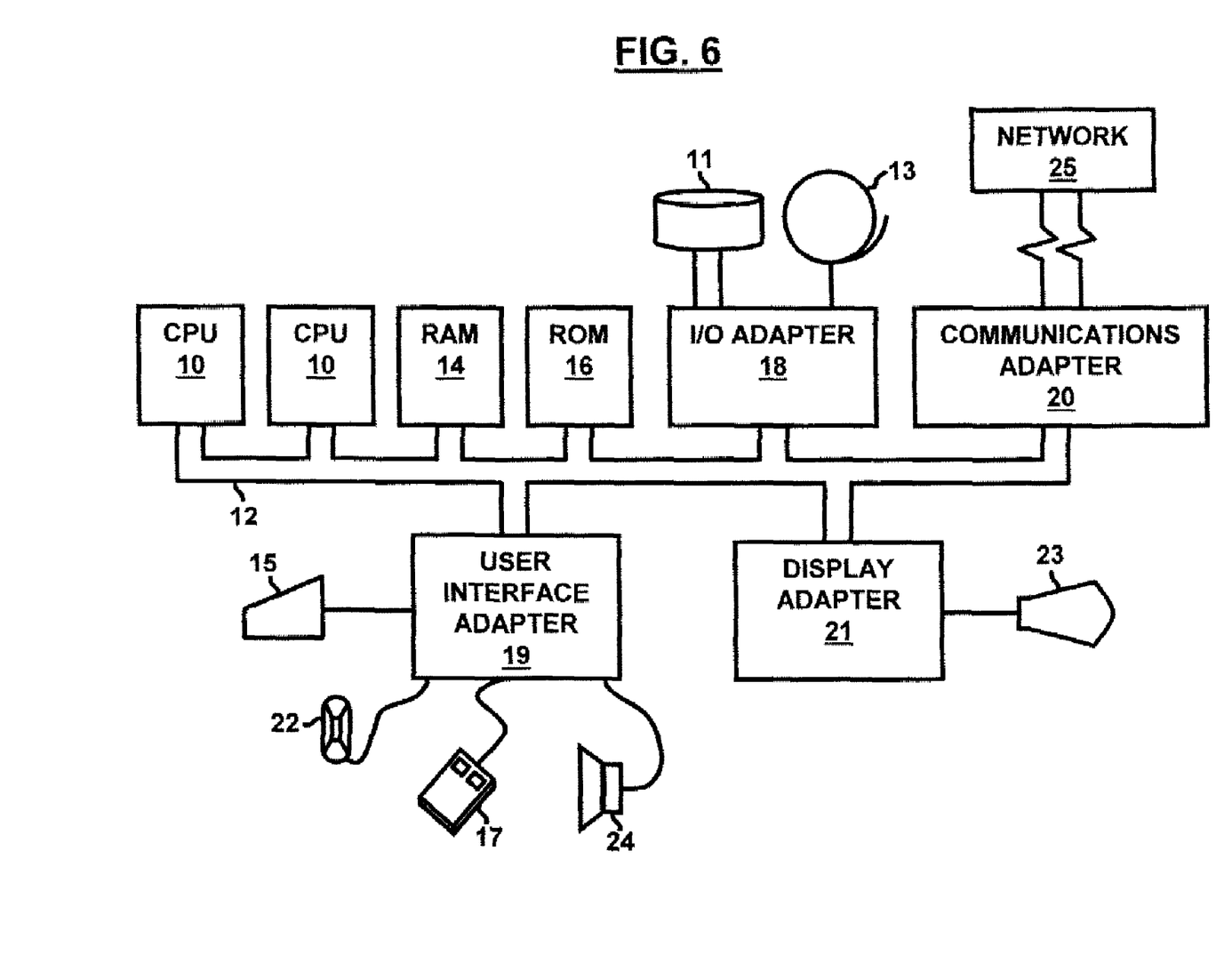
FIG. 6 illustrates a schematic diagram of a computer system according to an embodiment herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein can be used for locating the position of ferromagnetic objects 105 in one or two passes. Again, the embodiments herein may be used for finding the position of a stationary or moving object 105. As previously mentioned, finding ferromagnetic objects by rastering over large areas can be quite time consuming. However, the technique provided by the embodiments herein are much faster because one only has to pass by the object 105 once or twice.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of locating a ferromagnetic object in an area of detection represented by a dimensional space comprising x, y, and z axes, said method comprising:

moving an array of magnetic sensors along a straight line path with a velocity v in said area of detection;

using said magnetic sensors to measure a total magnetic field in said area of detection;

using said magnetic sensors to measure three vector components of magnetic field as said array of magnetic sensors travels along said path and passes said ferromagnetic object;

computing theoretical vector components of said total magnetic field in said area of detection;

matching the measured vector components of said total magnetic field with the computed theoretical vector components of said total magnetic field;

calculating an error measurement, E, between matched measured vector components and computed theoretical vector components of said magnetic field;

determining optimized values of parameters that minimize an error between the measured vector components and computed theoretical vector components of said magnetic field; and determining a position of said ferromagnetic object based on said measured components of said magnetic field as a function of the optimized values of said parameters and, wherein said magnetic components of said magnetic field comprise three calculated magnetic vector components are represented by:

$$B_{cx}=[3n_x(t)(\vec{n}(x)\cdot\vec{M})-M_x]/r(t)^3$$

$$B_{cy}=[3n_y(t)(\vec{n}(x)\cdot\vec{M})-M_y]/r(t)^3$$

$$B_{cz}=[3n_z(t)(\vec{n}(x)\cdot\vec{M})-M_z]/r(t)^3$$

as said magnetic sensors are moved in said straight line path past said ferromagnetic object, wherein $M_x = M\sin(\phi)\cos(\theta)$, $M_y = M\sin(\phi)\sin(\theta)$, and $M_z = M\cos(\phi)$, and wherein $\vec{n}(x)$ is a unit vector between a magnetic dipole of said ferromagnetic object and a position of said magnetic sensors.

2. The method of claim 1, wherein $$n_x = vt/r$$

$$n_y = y/r$$

$$n_z = z/r$$

$$r = \sqrt{(vt)^2 + y^2 + z^2}$$

are components of $\vec{n}(x)$, t is time, and v is velocity along said straight line path.

3. The method of claim 1, wherein said matching comprises matching an amplitude of a largest measured vector component of said magnetic field to a corresponding computed theoretical vector component of the magnetic field by multiplying the computed theoretical vector components of said magnetic field by a predetermined constant.

4. The method of claim 1, further comprising shifting a position along an x axis for the magnetic field vector components such that a maximum of the vector component corresponding to a largest measured component occurs at a same x axis coordinate.

5. The method of claim 1, wherein the error measurement, E, is determined by:

$$E^2 = (1/T)\int_0^T [(B_{cx}(t) - B_{mx}(t))^2 + (B_{cy}(t) - B_{my}(t))^2 + (B_{cz}(t) - B_{mz}(t))^2]\, dt$$

where $B_{mx}(t)$, $B_{my}(t)$, and $B_{mz}(t)$ are said measured vector components of said magnetic field as a function of t, and T is the time to pass the object.

6. The method of claim 5, further comprising determining values of angular parameters to specify a direction of magnetization of said ferromagnetic object to determine computed theoretical vector components that minimize said error measurement, E, wherein said values represent optimized values.

7. The method of claim 6, further comprising using said values of said angular parameters that minimize said error measurement, E, to calculate a position where a maximum total magnetic field occurs.

8. The method of claim 7, further comprising determining a shift of position along the x axis between a position of said ferromagnetic object and said position where a maximum total magnetic field occurs.

9. A program storage device readable by computer comprising a program of instructions executable by said computer to perform a method of locating a ferromagnetic object in an area of detection represented by a dimensional space comprising x, y, and z axes, said method comprising:

moving an array of magnetic sensors along a straight line path with a velocity v in said area of detection;

using said magnetic sensors to measure a total magnetic field in said area of detection;

using said magnetic sensors to measure three vector components of magnetic field as said array of magnetic sensors travels along said path and passes said ferromagnetic object;

computing theoretical vector components of said total magnetic field in said area of detection;

matching the measured vector components of said total magnetic field with the computed theoretical vector components of said total magnetic field;

calculating an error measurement, E, between matched measured vector components and computed theoretical vector components of said magnetic field;

determining optimized values of parameters that minimize an error between the measured vector components and computed theoretical vector components of said magnetic field; and determining a position of said ferromagnetic object based on said measured components of said magnetic field as a function of the optimized values of said parameters, and;

wherein said magnetic components of said magnetic field comprise three calculated magnetic vector components are represented by:

$$B_{cx}=[3n_x(t)(\vec{n}(x)\cdot\vec{M})-M_x]/r(t)^3$$

$$B_{cy}=[3n_y(t)(\vec{n}(x)\cdot\vec{M})-M_y]/r(t)^3$$

$$B_{cz}=[3n_z(t)(\vec{n}(x)\cdot\vec{M})-M_z]/r(t)^3$$

as said magnetic sensors are moved in said straight line path past said ferromagnetic object, wherein $M_x = M\sin(\phi)\cos(\theta)$, $M_y = M\sin(\phi)\sin(\theta)$, and $M_z = M\cos(\phi)$, and wherein $\vec{n}(x)$ is a unit vector between a magnetic dipole of said ferromagnetic object and a position of said magnetic sensors.

10. The program storage device of claim 9, wherein $$n_x = vt/r$$

$$n_y = y/r$$

$$n_z = z/r$$

$$r = \sqrt{(vt)^2 + y^2 + z^2}$$

are components of $\vec{n}(x)$, t is time, and v is velocity along said straight line path.

11. The program storage device of claim 9, wherein in said method, said matching comprises matching an amplitude of a largest measured vector component of said magnetic field to a corresponding computed theoretical vector component of the magnetic field by multiplying the computed theoretical vector components of said magnetic field by a predetermined constant.

12. The program storage device of claim 9, wherein said method further comprises shifting a position along an x axis for the magnetic field vector components such that a maximum of the vector component corresponding to a largest measured component occurs at a same x axis coordinate.

13. The program storage device of claim 9, wherein the error measurement, E, is determined by:

$$E^2 = (1/T)\int_0^T [(B_{cx}(t) - B_{mx}(t))^2 + (B_{cy}(t) - B_{my}(t))^2 + (B_{cz}(t) - B_{mz}(t))^2]\,dt$$

where $B_{mx}(t)$, $B_{my}(t)$, and $B_{mz}(t)$ are said measured vector components of said magnetic field as a function of t, and T is the time to pass the object.

14. The program storage device of claim 13, wherein said method further comprises determining values of angular parameters to specify a direction of magnetization of said ferromagnetic object to determine computed theoretical vector components that minimize said error measurement, E, wherein said values represent optimized values.

15. The program storage device of claim 14, wherein said method further comprises using said values of said angular parameters that minimize said error measurement, E, to calculate a position where a maximum total magnetic field occurs.

16. The program storage device of claim 15, wherein said method further comprises determining a shift of position along the x axis between a position of said ferromagnetic object and said position where a maximum total magnetic field occurs.

17. A system for locating a ferromagnetic object in an area of detection represented by a dimensional space comprising x, y, and z axes, said system comprising:

an array of magnetic sensors moving along a straight line path with a velocity v in said area of detection, wherein said magnetic sensors are adapted to (i) measure a total magnetic field in said area of detection, and (ii) measure three vector components of magnetic field as said array of magnetic sensors travels along said path and passes said ferromagnetic object;

processing means for computing theoretical vector components of said total magnetic field in said area of detection;

processing means for matching the measured vector components of said total magnetic field with the computed theoretical vector components of said total magnetic field;

processing means for calculating an error measurement, E, between matched measured vector components and computed theoretical vector components of said magnetic field;

processing means for determining optimized values of parameters that minimize an error between the measured vector components and computed theoretical vector components of said magnetic field; and processing means for determining a position of said ferromagnetic object based on said measured components of said magnetic field as a function of the optimized values of said parameters and;

wherein said magnetic components of said magnetic field comprise three calculated magnetic vector components are represented by:

$$B_{cx} = [3n_x(t)(\vec{n}(x)\cdot\vec{M}) - M_x]/r(t)^3$$

$$B_{cy} = [3n_y(t)(\vec{n}(x)\cdot\vec{M}) - M_y]/r(t)^3$$

$$B_{cz} = [3n_z(t)(\vec{n}(x)\cdot\vec{M}) - M_z]/r(t)^3$$

as said magnetic sensors are moved in said straight line path past said ferromagnetic object, wherein $M_x = M\sin(\phi)\cos(\theta)$, $M_y = M\sin(\phi)\sin(\theta)$, and $M_z = M\cos(\phi)$, and wherein $\vec{n}(x)$ is a unit vector between a magnetic dipole of said ferromagnetic object and a position of said magnetic sensors, and wherein $$n_x = vt/r$$

$$n_y = y/r$$

$$n_z = z/r$$

$$r = \sqrt{(vt)^2 + y^2 + z^2}$$

are components of $\vec{n}(x)$, t is time, and v is velocity along said straight line path, caused by motion against said layers of stacked frangible microcapsules when subjected to a setback force.

\* \* \* \* \*